United States Patent
Grühn et al.

(10) Patent No.: US 7,272,540 B2
(45) Date of Patent: Sep. 18, 2007

(54) METHOD AND DEVICE FOR MULTISTAGE DATA PROCESSING, OF A POWER GENERATING STATION

(75) Inventors: Michael Grühn, Erlangen (DE); Ulrich Kunze, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 198 days.

(21) Appl. No.: 10/909,806

(22) Filed: Jul. 31, 2004

(65) Prior Publication Data

US 2005/0038634 A1  Feb. 17, 2005

(30) Foreign Application Priority Data

Aug. 13, 2003  (EP) .................................. 03018414

(51) Int. Cl.
*G06F 15/00* (2006.01)

(52) U.S. Cl. .................................... 702/189

(58) Field of Classification Search ............... 702/189
See application file for complete search history.

(56) References Cited

U.S. PATENT DOCUMENTS

| | | | |
|---|---|---|---|
| 5,469,150 A | 11/1995 | Sitte | |
| 5,884,206 A | 3/1999 | Kim | |
| 5,978,753 A * | 11/1999 | Eidson | ................ 702/188 |
| 5,997,166 A | 12/1999 | Flood | |
| 6,002,996 A * | 12/1999 | Burks et al. | ............. 702/188 |
| 6,751,563 B2 * | 6/2004 | Spanier et al. | ............ 702/61 |

* cited by examiner

*Primary Examiner*—Bryan Bui
*Assistant Examiner*—Jonathan Moffat

(57) ABSTRACT

In a method according to the invention or a corresponding device data generated in a technical system is captured and provided with an information element. A sequential data processing of the data takes place by means of at least two data processing modules in preferably random order, whereby the status of the information element is changed.

15 Claims, 1 Drawing Sheet

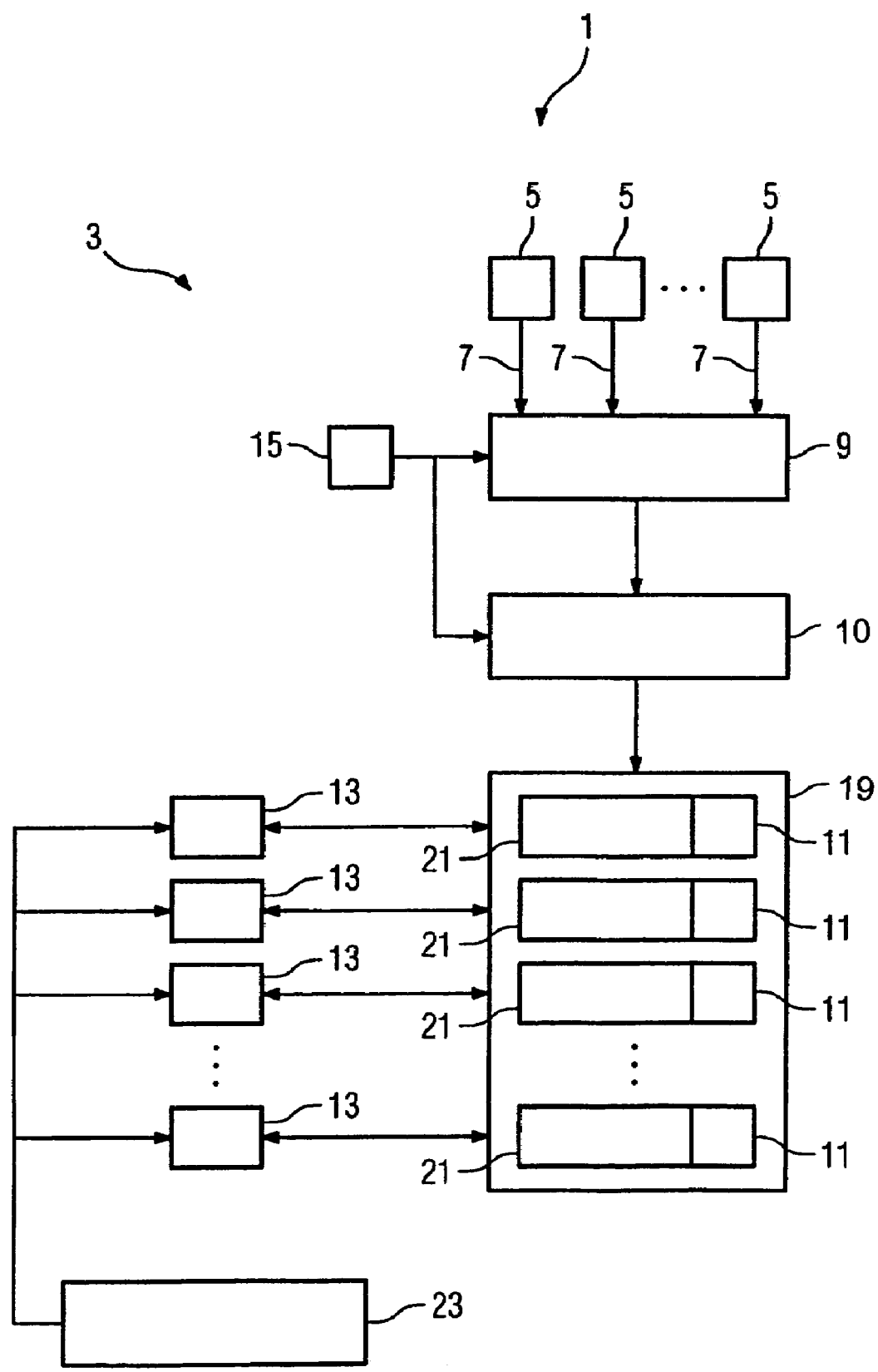

METHOD AND DEVICE FOR MULTISTAGE DATA PROCESSING, OF A POWER GENERATING STATION

CROSS REFERENCE TO RELATED APPLICATIONS

This application claims priority of the European application No. 03018414.7 EP filed Aug. 13, 2003 under the European Patent Convention, which is incorporated by reference herein in its entirety.

FIELD OF THE INVENTION

The invention relates to a method and a device for multistage data processing in a technical system, such as a power generating station, wherein a complex data analysis is executed in several processing steps.

BACKGROUND OF THE INVENTION

In order to monitor the status of a technical system while in operation and to generate diagnostics relating to the behavior of the power station components, a plurality of technical variables (for example pressure, temperature and flow) are generally recorded by means of sensors and the measured values achieved thereby are evaluated.

However, knowledge of these measured values alone is generally insufficient in order to be able to evaluate the status of a technical system, with the consequence that the captured data must be supplied to a further processing facility. In this process characteristic variables, for example, are determined which possess a substantially higher, and more often than not, explicit significance compared with the raw measured values, thus providing a basis to enable selective monitoring and diagnosis of the technical system.

A known method for further data analysis of the captured data is to use a control device which controls the data processing in its entirety. However, this control device must monitor the execution of the multistage data processing from beginning to end. In each of the individual stages of the data processing, the captured data is subjected to a specific analysis in a fixed sequence and a characteristic variable, for example, is determined at each stage. In the event that an error occurs during this data processing in one of the stages or in the control device itself, whether as a result of the fact that the data analysis was designed incorrectly or because the technical system or its measured value acquisition is in a state for which the data analysis was previously not designed, the control device usually aborts the data processing.

It is then generally very difficult to determine at which point in the data processing a search for the error should be initiated, with the result that the monitoring and diagnostics system or even the technical system itself must often be switched off during troubleshooting. If the monitoring system is switched off during troubleshooting, data accumulated during this downtime will not be longer available subsequently for, say, a long-term analysis of the behavior of the technical system, which in turn reduces the accuracy of the monitoring and diagnosis.

SUMMARY OF THE INVENTION

The object of the invention is therefore to specify a method and a device of the aforementioned type which work particularly reliably and can be operated flexibly.

With reference to the method, the object is achieved according to the invention by a method for multistage data processing, in particular for diagnostics, in a technical system, comprising the following steps:

At least part of the data acquired in the technical system is captured while the technical system is in operation.

The captured data is assigned at least one information element by means of which the processing status of the data can be identified.

The captured data is processed sequentially by means of at least two data processing modules, whereby the data processing modules change the status of the information element.

By this means it is possible to see from the status of the information element whether a specific stage of the data processing has already taken place, and if so, which, or whether it was erroneous.

A possibly necessary troubleshooting operation is then greatly facilitated through evaluation of the status of the information element. Each of the data analysis modules is autonomous and in addition may be capable of picking out from the captured data that data in which the status of the respective information element indicates that the data in question is prepared for processing by the current data processing module.

The relevant data processing module then initiates the processing of the captured data or a part thereof. In the process the module can change the status of the information such that it can be seen therefrom that the relevant data is currently being processed in the current data processing module. The results of the data processing can be added to the captured data by the data processing module and if necessary stored.

After the data has been processed by the current data processing module, the current data processing module preferably changes the status of the information element so that it is recognizable from it whether the data was processed successfully or unsuccessfully. It is thus clear from the status of the information element whether the relevant data processing module was able to generate meaningful processing results, for example characteristic variables.

Owing to the modifiable status of the information element, the captured data can be specifically identified by other data processing modules according to the current status of the information element and supplied to a further processing operation, since the current status of the information element indicates the suitability of the currently present data for further analysis in a next stage.

Furthermore, it can be determined on the basis of the status of the information element which processing stages the data has already passed through.

A controller for monitoring and coordinating the multistage data processing is therefore superfluous.

It is only necessary to ensure that the processing cycles of the data processing modules are started sufficiently often so that the data can pass through all the required data processing modules within a required processing time.

One important advantage of the method according to the invention is apparent in that each stage of the data processing takes place by means of a separate data processing module assigned to each respective stage and that therefore the failure of one or more of the data processing modules does not adversely affect either the operability of any of the other data processing modules and hence the determination of corresponding partial processing results. Consequently there are at least as many useful partial results present as there are operational analysis modules, or as many analysis modules which are suitable for processing data according to their respective analysis algorithm.

Furthermore, defective analysis modules can be rapidly identified on the basis of the current status of the information element and replaced by corresponding replacement modules. These replacement modules can then repeat the failed processing and rectify any errors.

The information element represents the history of the data with regard to the stages of the data processing which it has already passed through.

Furthermore, it is possible to implement the analysis modules within computer networks, for example within the internet, since a central coordination of the individual analysis modules is not necessary.

The sequence of the data processing by means of the at least two data processing modules is advantageously random.

Since in a method according to the invention multiple stages of the data processing are implemented in each case by means of at least one data processing module, in each case at least some of these data processing modules can be assigned the task of an independently executable data processing operation which does not require any processing results of other data processing stages. With this embodiment of the invention it is therefore irrelevant in which sequences the data is processed by the data processing modules. This means that when computers are used, the available processing time can be optimized in that, for example, the data is preferably processed in a next step of that analysis module which is available immediately and provides sufficient free computing time.

In a preferred form of embodiment of the invention, the acquisition of data is clock-controlled.

In order to obtain a continuous picture of the behavior of the technical system it is particularly advantageous if the accumulating data is captured at fixed time intervals. This can be effected for example by means of a device for measured value acquisition which is triggered by means of a clock generator and thereupon reads in desired measured values. As the time interval between two clock cycles is usually constant or at least known, a gradient, i.e. a trend of the measured values under consideration, can also be determined in a simple manner.

In a particularly preferred form of embodiment, the captured data is subdivided into a number of data packets.

This subdivision into data packets can also be controlled by a clock generator. In this way, for example, the data from one or more of the intervals specified by the clock can form a data packet. In this case it is not necessary for the time intervals to be of equal length or for a data packet always to be formed from the same number of time intervals.

One particular advantage of the formation of data packets is to be seen in the fact that a data packet can serve to combine such parts of the captured data which are related to each other in a particular way and/or which are of particular interest and/or which are to be processed together. By means of the data packet formation, the captured data can be subjected to a first sorting operation.

The formation of data packets can also be used to analyze the modification over time of a fixed collection of measured values which are combined in a data packet, said analysis being accomplished by means of the data processing modules. Toward that end, the current measured values of specific process variables of the technical system are captured for example at specified time intervals and combined in a separate data packet. A comparison of corresponding data packets from different clock cycles then allows a trend of the data contained in the data packet to be determined in a simple manner.

Furthermore it is advantageous if each data packet is assigned at least one information element.

With this embodiment it is also possible make a pronouncement regarding the processing status of the respective data packet for parts of the captured data which are combined in a data packet. In this way, on the one hand the detection of a possibly defective data processing module is further facilitated. On the other hand, in the event that a data processing module is not suitable for processing specific data due to its processing algorithm, neither a large amount nor the entire amount of captured data is affected by the unsuitability of the respective data processing module; only those data packets which contain this type of non-processable data remain unprocessed.

In a further preferred embodiment of the invention, the captured data is stored in a memory, in particular in a database.

In this way, not only data currently being acquired, but also the historical data in the technical system can be subjected to an analysis by means of the processing modules. Furthermore, the stored data can be used to test and optimize the data processing modules.

The status of the information element preferably represents a processing status of the captured data.

The processing status of the captured data can, for example, provide information about which of the data processing modules the captured data has already passed through and/or whether the processing that took place therein, in particular the determination of processing results, was successful.

In a further advantageous embodiment of the invention, the data processing performed by the data processing modules is controlled by a control device.

In this arrangement the control device can for example ensure that a particular processing cycle of the data processing modules is started sufficiently frequently for the data packets to be able to pass through all the desired data processing modules and thus all the desired processing stages within a desired processing time. Furthermore, the control device can also control the distribution of an available computing capacity.

The control device can be embodied as a single, central control device for all data processing stages or alternatively as a plurality of control devices, wherein at least some of the data processing modules are assigned their own control device.

The data processing modules are advantageously clock-controlled. Clock control of the data processing modules enables, for example, their processing cycle to be started at desired time intervals. In this way, the length of the clock cycle can be adapted to the respective required computing time of the data processing stages, thus optimizing the required processing time of the data in the data processing modules.

The invention further leads to a device for multistage data processing, in particular for diagnostics, in a technical system comprising the following components:

at least one device for measured value acquisition by means of which at least part of the data acquired in the technical system can be captured while the technical system is in operation, at least one information element assigned to the captured data, by means of which element the processing status of the data can be identified, and at least two data processing modules for sequential processing of the captured data, the status of the information element being modifiable by means of the data processing modules.

Further advantageous embodiments of the inventive device are set forth in the dependent claims.

BRIEF DESCRIPTION OF THE DRAWING

An exemplary embodiment of the invention is described in more detail below with reference to the drawing, in which:

FIGURE shows an inventive device for multistage data processing comprising a plurality of data processing modules.

DETAILED DESCRIPTION OF THE INVENTION

The FIGURE shows a schematic diagram of an inventive device 1.

A plurality of processes 5 execute in a technical system 3, which processes 5 generate data 7, for example by means of measured values captured by means of sensors. This data 7 is read in by a device 9 for measured value acquisition. The reading in of the data is controlled by means of a clock generator 15.

In a processing unit 10, the captured data 7 is subdivided into data packets 21. This subdivision can comprise for example a grouping and thus a subdivision of the data captured during a clock cycle or a collection of data packets 21, each containing data of similar type from different clock cycles.

The data packets 21 are each provided with an information element 11 which represents the processing status of the respective data packet.

The data packets 21 are advantageously stored in a memory 19. The data processing of the data packets 21 is handled by a plurality of data processing modules 13, each of which implements a data processing stage.

The data processing modules 13 are implemented separately from each other, so that the failure of one or more of the data processing modules 13 does not adversely affect the function of each of the other data processing modules.

On the basis of the current status of the information element 11, one or more of the data processing modules 13 filter out and process those data packets 21 which are suitable or prepared for processing or further processing by the respective data processing module 13. The data processing results determined by the data processing modules, for example characteristic variables, can be added to the respective processed data packets 21 by the data processing modules 13.

Furthermore, the data processing modules 13 change the status of the information element 11, said element changing its status for example when processing by a specific data processing module 13 is initiated, and this value being changed again when the corresponding processing result is available.

Thus, on the basis of the current status of the information element 11, it is easy for the data processing module 13 to determine which data processing stages a specific data packet 12 has already passed through. If it is not possible for one of the data processing modules 13 to determine a processing result, the value of the information element 11 can likewise be changed so that a failure of the data processing of a data packet by a specific data processing module 13 can also be easily identified.

As demonstrated in the present exemplary embodiment, the coordination of the data processing modules 13 can be implemented by means of a central control unit 23 for the data processing modules 13. It is however also possible that each data processing module 13 is assigned its own control unit.

The invention claimed is:

1. A method for multistage data processing in a power generating station, comprising:
   acquiring data regarding the electric power generating station;
   selecting portions of the acquired data wherein said data is based upon measured values obtained by a sensor;
   providing a respective information element that is associated, transmitted and stored along with each respective portion of the acquired data;
   identifying a respective processing status for each respective portion of the acquired data;
   assigning each identified processing status of each respective portion of the acquired data to its associated information element;
   sequentially processing each portion of the acquired data by a plurality of autonomous data processing modules, wherein a processing sequence is based at least in part upon the assigned processing status of each respective portion of the acquired data; and
   changing the status of a respective information element to indicate a processing status change regarding the portion of the acquired data associated with said respective information element, wherein the status processing change occurs due to one or more processing actions performed by at least one of the data processing modules.

2. The method according to claim 1, wherein the sequence of the data processing by the plurality of autonomous data processing modules is performed at random intervals of time.

3. The method according to claim 1, wherein the acquisition of the data is in a clock-controlled manner.

4. The method according to claim 1, wherein the acquired data is subdivided into a plurality of data packets.

5. The method according to claim 4, wherein each data packet is assigned an information element that is transmitted and stored along with the data packet.

6. The method according to claim 1, wherein the processing status comprises information regarding whether the acquired data has already been processed by a specific data processing module and whether this processing was successful.

7. The method according to claim 1, wherein the processing status comprises information regarding whether the acquired data has already been processed by a specific automomous data processing module or whether this processing was successful.

8. The method according to claim 1, wherein the data processing performed by the automomous data processing modules is controlled by a control device.

9. The method according to claim 8, wherein a portion of the automomous data processing modules ate assigned to a distinct control device.

10. The method according to claim 1, wherein the automomous data processing modules are clock-controlled.

11. A device for multistage data processing in a power generating station, comprising, an apparatus for data acquisition regarding the power generating station, such that respective portions of the data acquired in the power generating station are captured while the power generating station is in operation;

a respective information element assigned to each respective portion of the captured data, wherein a respective processing status of each respective portion of the captured data is identified by each respective element; and a plurality of automomous data processing modules for sequentially processing each portion of the captured data, wherein a processing sequence is based at least in part upon each identified processing status of each respective portion of the captured data, and further wherein the status of a respective information element can be modified in response to a processing status change regarding the portion of the captured data associated with said respective information element, wherein the status processing change occurs due to one or more processing actions performed by at least one of the data processing modules.

12. The device according to claim 11, further comprising a clock generator for clock-controlled acquisition of the data.

13. The device according to claim 11, wherein the captured data can be subdivided into a number of data packets by a processing unit.

14. The device according to claim 13, wherein each data packet is assigned a distinct information element that is transmitted and stored along with the data packet.

15. The device according to claim 11, wherein the data processing performed by the autonomous data processing modules is controlled by a control unit.

* * * * *